Patented Mar. 4, 1952

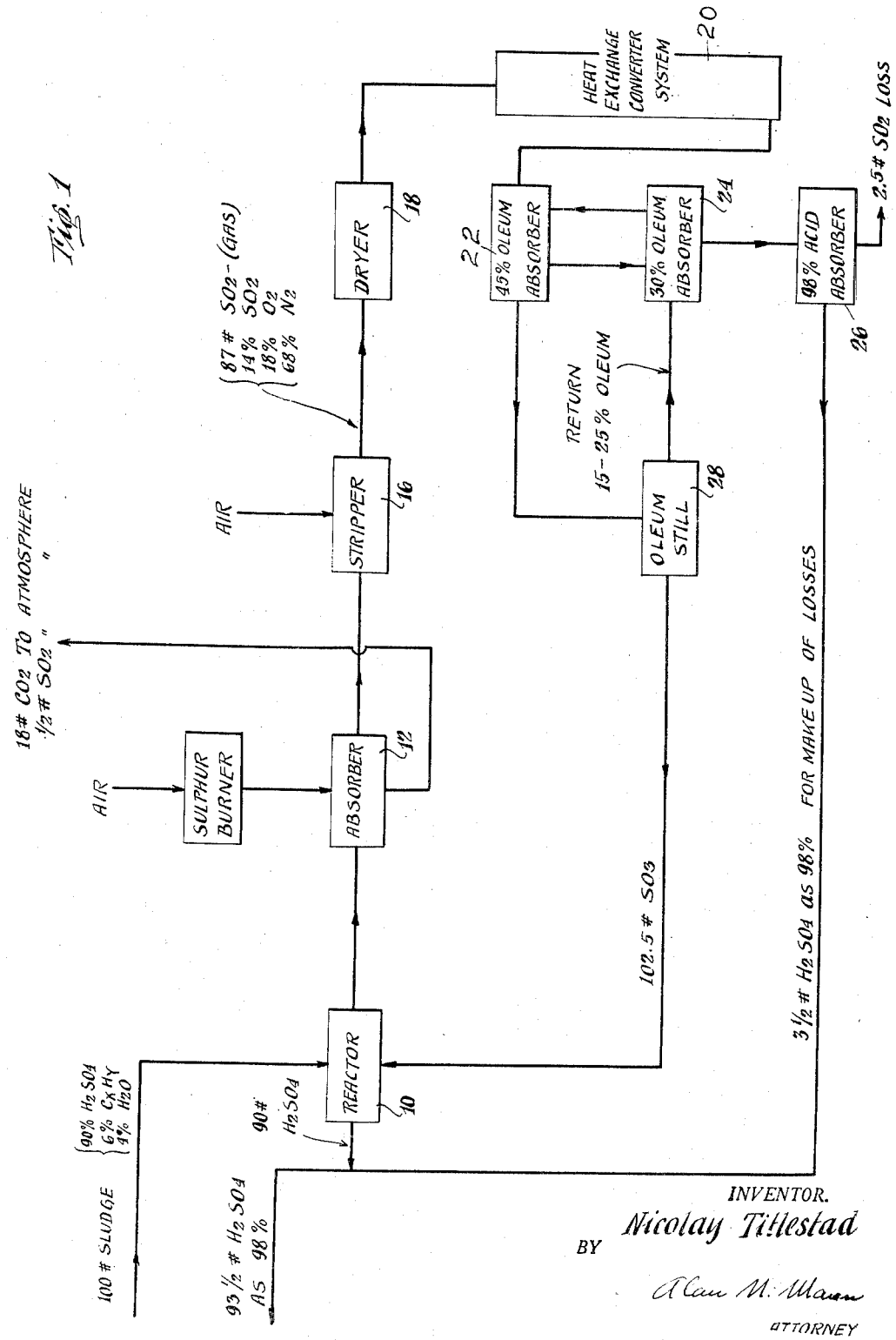

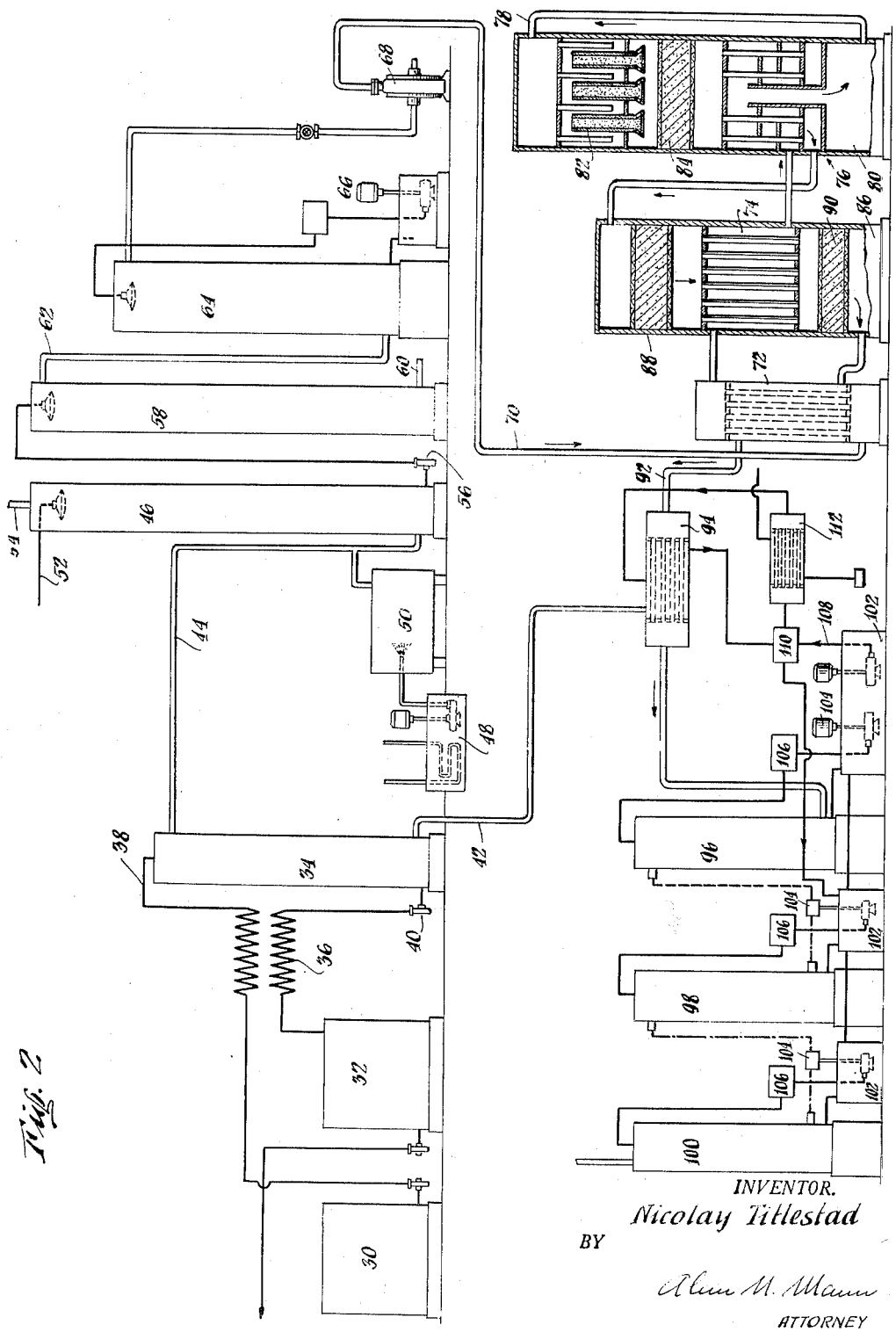

2,588,331

UNITED STATES PATENT OFFICE 2,588,331

RECOVERY OF ALKYLATION SLUDGE ACIDS

Nicolay Titlestad, White Plains, N. Y., assignor to Nicolay Titlestad Corporation, a corporation of New York Application March 20, 1948, Serial No. 16,044

4 Claims. (Cl. 23—173)

This invention relates to a process for treating acid sludges for the purpose of acid recovery and in particular for treating oil refinery sludges produced by the so-called alkylation process of producing gasoline.

Various methods have been suggested for treating the usual types of refinery sludges which are ordinarily high in hydrocarbons. Other processes have been suggested for treating waste acid containing only small amounts of hydrocarbons. For example, it has been suggested that $SO_3$ be passed into an acid sludge to bring the strength of the acid up to about 98% and that thereafter the temperature of the acid mixture be heated to a temperature of around 610° F. to oxidize the free and combined carbon present. I find that this process is quite inoperative for treating acid sludges of the alkylation type where the carbon amounts to between 4% and 8% and averages about 6%.

I have frequently endeavored to decompose carbonaceous matter in sulphuric acid by heat and have found that this is practically impossible unless a specific oxidizing agent is present. Such oxidizing agent might, for example, be potassium bichromate or nitric acid. I have also found that if free $SO_3$ is present, this will also serve.

Another practical difficulty with the process referred to is that the cost of equipment is virtually prohibitive where heat is to be transmitted into the reaction mass from the outside. Ordinarily cast iron will rapidly deteriorate, and if the process is to be carried on at all, it is necessary to use some very expensive material such as a high silicon iron of the type used for corrosion resistance.

It may further be computed that if one has a sludge containing approximately 6% of carbonaceous material and the balance is computed as acid brought up to about 98% strength and the material is heated with an oxidizing agent to cause oxidation of the carbonaceous material, virtually all of the sulphuric acid will be used and there will only be a recovery of a very small percentage, at best, of available acid.

I have succeeded in solving this problem and overcoming the above difficulties by passing into an alkylation sludge an amount of free $SO_3$ gas slightly below the theoretical amount necessary to oxidize all of the carbonaceous material present. Initially the sludge may be heated but when the reaction starts, enough heat will be generated by the reaction to insure the acid reaching the temperature of a constant-boiling sulphuric acid of approximately 98.3% strength. Excess water will be driven off and the concentrated acid can be continuously withdrawn from the apparatus. That is, under normal atmospheric pressures the acid will reach a temperature of approximately 626° F.

It is advisable to react the sludge and $SO_3$ in counter-current. The sludge is fed into the reactor at the top and passes down, gradually becoming more and more purified. The gas is introduced at the bottom so that a large concentration of gas contacts the sludge where the hydrocarbons are reduced to a minimum insuring that the acid drawn off from the bottom of the reactor is properly purified and concentrated. At the same time the sludge carrying the major percentage of hydrocarbons will contact the emerging stream of gases and vapors thereby insuring against $SO_3$ passing off to form undesirable acid fogs.

While this process consumes a relatively large amount of $SO_3$ gas, I have found that the process can be carried out economically by recovering the reaction vapors and gases. When the $SO_3$ gas reacts with the hydrocarbon of the sludge, $SO_2$, $CO_2$ and water vapors are generated. In carrying out my invention it is contemplated that this gas mixture shall be treated to separate the $SO_2$ from the $CO_2$ and water vapor; the $SO_2$ is to be converted back to $SO_3$ and this $SO_3$ is to be reconcentrated so that it can again be employed in the process. In this way by supplying a small amount of make-up sulphuric acid, the $SO_3$ used in the process for decomposing the hydrocarbon can, in substance, be recycled through the process and substantially all of the sulphuric acid of the sludge can be recovered in purified and concentrated form.

It will be obvious that this process can readily be employed with sludges containing a wide variation in the percentages of hydrocarbons, as this simply will demand that more or less $SO_3$ gas will be cycled through the process and this can be independent of the amount of acid contained in the sludge. However, I find that in order to carry out this process economically the sludge should contain at least about 4% of hydrocarbon, as otherwise the heat generated may be insufficient to maintain the reaction temperature and to distill off the water to form a 98.3% sulphuric acid. If the amount of hydrocarbon is toward the low end of the range, it may be advisable to use a heat exchanger (as illustrated hereafter) to withdraw some of the heat from the recovered acid and use this to preheat incoming acid sludge.

Alkylation sludges differ from ordinary sludges not only in their hydrocarbon content but also in that they are high in sulphuric acid and low in free water. They may, for example, contain from 88% to 92% $H_2SO_4$, from 3% to 5% water and from 4% to 8% hydrocarbons. Because of this difference in composition, they differ materially in nature from the ordinary sludges.

In an earlier application, Ser. No. 446,719, now Patent No. 2,406,930, I described a method of treating alkylation sludges by combustion at high temperature with simultaneous decomposition of the sulphuric acid into $SO_2$, $H_2O$ and $O_2$. The present application relates to a new method of treating this material, being quite a different process.

Briefly stated it will be seen that my process is one in which the hydrocarbons of an acid petroleum sludge are treated with $SO_3$ gas to convert the hydrocarbons to $CO_2$ and water, with a reduction of the $SO_3$ to $SO_2$. These gases and vapors are then separated from the residual decomposed sulphuric acid and the $SO_2$ is reoxidized to $SO_3$ for use in treating additional quantities of sludge.

This invention can readily be understood by reference to the accompanying drawings in which Fig. 1 is a flow sheet and Fig. 2 is a diagrammatic showing of the type of equipment which I have found advantageous for use in this process.

The diagram of Fig. 1 is worked out to illustrate the treatment of an alkylation sludge containing 90% sulphuric acid, 4% water and 6% hydrocarbon the exact composition of which is unknown and which is therefore designated by the symbol $C_xH_y$ but which on analysis showed 86% C and 14% H. 100 parts by weight of this sludge are introduced per unit of time into a reactor 10 and treated with 102.5 parts of concentrated $SO_3$ gas. The temperature in the reactor 10 rises up to a maximum equal to the boiling point of the acid mixture, which may vary with the concentration and atmospheric pressure but generally will be between 600° F. and 650° F. (the theoretical temperature is 626° F.). As this $SO_3$ gas oxidizes the hydrocarbons to $CO_2$ and water the $SO_3$ is reduced to $SO_2$. This reaction is exothermic so that water will distil off and the temperature will tend to rise to the constant boiling point of sulphuric acid equivalent to an acid strength of 98.3% at which concentration the acid is withdrawn from the reactor and after cooling returned to the oil refinery for reuse. If desired this acid can be fortified in the acid plant in the usual manner.

Under the conditions stated in this example the gases withdrawn from the reactor will contain approximately 18.7 parts of $CO_2$, 82 parts of $SO_3$ and 9.7 parts of $H_2O$. These are passed to the absorber 12 where the $SO_2$ is absorbed in water. At the same time the $SO_2$ resulting from burning 2.8 parts of sulphur in the sulphur burner 14 may be added to the gas mixture as "make-up" for losses. The $CO_2$ will be absorbed only to a very small extent and therefore practically all of the $CO_2$ (with about one-half part of $SO_2$) will escape to the atmosphere from absorber 12.

The solution of $SO_2$ gas from the absorber 12 is passed to the stripper 16 where the $SO_2$ gas is stripped with air to give a gas mixture containing, for example, 87 parts of $SO_2$ blended with air in the proportion to have present 14% $SO_2$, 18% $O_2$ and 68% $N_2$. While this proportion of air is not critical, it is advantageous to keep the percentage of $SO_3$ high, and I prefer to keep it above 10%. The resulting gas mixture is passed through the drier 18 and then to a heat exchange converter system indicated at 20 but which will be more fully described in connection with Fig. 2.

The $SO_3$ gas from the converter system 20 passes to an absorber 22 in which it is absorbed in oleum which has an initial strength of about 30% and which is brought up to about 40% to 45% oleum in this absorber. Excess $SO_3$ is then conveyed in counter current to the 30% oleum absorber 24 and finally to the 98% acid absorber 26. About 2.5 parts of $SO_2$ which have been unconverted may be lost.

The 45% oleum from the absorber 22 is conducted to the oleum still 28 and substantially pure $SO_3$ is distilled off so that an oleum of from 15% to 25% strength is returned to the absorber 24. The acid in the absorber 26 may be either acid of 98.3% obtained from the reactor 10 or may be new acid used in the ordinary manner in a contact acid plant. In any event about 3½ parts of 98% acid are withdrawn from the absorber 26 to make up for losses in the process. At the same time 102.5 parts of $SO_3$ are withdrawn from the oleum still 28 and returned to the reactor 10 for treatment of additional quantities of sludge.

While for the purposes of convenience the quantities employed are named as if they were definitely fixed amounts it is understood that the process is continuous and that these quantities are relative and indicate the rate of movement of the various materials through the apparatus.

For the purpose of distilling the $SO_3$ from the oleum still 28 I prefer to use the surplus heat resulting from the conversion of $SO_2$ to $SO_3$. The gases in this type of conversion plant will leave at a temperature of between about 700° F. and 750° F. By heat exchange between the hot weak oleum from the still and the strong product oleum taken to the still, the heat requirement of the process is reduced to such an extent that very little, if any extra heat is required. If extra heat is required I propose to use a small steam heated still or other easily operated still in series or in parallel with the heat exchanger and still mentioned above.

In similar manner when the $SO_3$ is introduced into the reactor 10 it is passed in counter current relative to the incoming sludge acid. By the reaction heat the temperature will increase to near the boiling point of the sulphuric acid whereby rapid oxidation takes place with the formation of $SO_2$, $CO_2$ and water as previously explained. By heat exchange of the product acid with the incoming acid or by cooling (if required) the proper temperature condition and heat regulation can be accomplished. It will be understood that the heat balance of the system is a variable one as the reaction heat increases with the hydrocarbon content of the sludge acid while the heat requirement increases with the water content of the sludge acid since any excess of water over 1.7% must be evaporated.

While the reaction is in general a relatively simple one its reduction to practical use involves a large number of steps and accordingly in Fig. 2 I have further illustrated a proposed manner of carrying out the process.

In this figure, 30 designates a tank for storage of alkylation acid to be fed to the process and 32 a tank for receiving the product acid of 98.3% strength. 34 is the reactor corresponding to reactor 10 of Fig. 1 which contains the usual acid-resisting brick work or rings of an acid contact tower. The alkylation acid from the tank 30 passes through the heat exchanger 36 and thence into the top of the reactor 34 by way of the pipe 38. The 98.3% acid is removed from the bottom of the reactor 34 by the pump 40 and returns through the heat exchanger 36 to the tank 32. The $SO_3$ gas for the reactor tank 34 is introduced into the bottom of the reactor through the pipe 42.

The mixture of $SO_2$ and $CO_2$ and moisture is discharged from the reactor 34 through the pipe 44 and introduced into the bottom of an absorption tower 46. 48 indicates a sulphur melting tank and 50 a sulphur burner of conventional type which introduces additional $SO_2$ gas into pipe 44.

Water is introduced into the top of the absorption tower 46 as indicated at 52, and the $CO_2$ carrying with it small quantities of $SO_2$ escapes from the tower by the pipe 54.

The strong $SO_2$ liquor containing from 4% to 6% of $SO_2$ is removed by pumps 56 and delivered into the top of a stripping tower 58 into which air is introduced near the bottom by the pipe 60. The resulting gas mixture containing about 14% $SO_2$ and 18% $O_2$ is withdrawn through the pipe 62 and introduced into the drier 64 where it is dried with acid. This acid may be either product acid of proper strength or alkylation acid before it is processed or the gas may be dried in any other conventional manner as required in order to produce proper water balance in the combined system, as is understood in the art of producing sulphuric acid. The numeral 66 indicates a conventional circulating system for circulating the acid through the drier 64. The $SO_2$ gas from the drying tower 64 is compressed by the blower 68 and supplied to the contact system through the pipe 70.

The gas introduced into the conversion equipment is a relatively strong one so that the reaction heat will tend to cause the temperature to rise to excessive levels and especial care must be taken for the protection of the catalyst by proper temperature regulation. Accordingly, I prefer to have the conversion take place in a number of stages with the gases passing through heat exchangers between the stages so as to remove excess heat.

In the example shown the gas mixture from the pipe 70 passes through the heat exchanger 72 and thence to the internal heat exchanger 74, then through the internal heat exchanger 76. The heated gases from this heat exchanger pass through the pipe 78 to the top of the primary converter 80 and thence pass downwardly through a tubular heat exchange converter 82. This is somewhat similar to the original converters which formerly were used with a platinized asbestos catalyst. I find it advantageous, however, to supply the gas through separate pipes to the outside bottom of the reaction tubes in order to obtain proper gas distribution. With as much as 10% $SO_2$ in the gas, the temperature rises rapidly and I prefer to use for the initial contact a catalytic mass diluted with inert material so as to slow down the reaction velocity of the gas and at the same time provide sufficient area for gas cooling.

The usual catalysts employed for oxidizing $SO_2$ to $SO_3$ include vanadium and are carried on kieselguhr or other carrier. A diluted catalytic mass to be used in my invention might for example be made up of the usual pellets carrying the vanadium catalyst with from 2 to 10 times the amount of pellets made up in the usual fashion except that no vanadium or other catalytic substance is included. This will give a catalytic mass of increased volume and thereby increase the time for heat exchange. Obviously other methods of diluting the catalytic mass may be employed.

After passing through the first tubular heat exchange converter, the gases pass to a tray containing a second catalytic mass 84 and thence through the heat exchanger 76. If preferred, a type of tubular heat exchange converter similar to that which is used with the first contact layer can be used for the second contact layer.

The gases from the primary converter 80 are now introduced into the top of the secondary converter 86 and passed through the third contact layer 88 and then after passing through the heat exchanger 74 go through the fourth contact layer 90 and thence out through the heat exchanger 72 in which the gases are cooled off from about 850° to between 700° and 750° F. at which temperature the gases pass out through the pipe 92 to the evaporator 94 (corresponding to oleum still 28 of Fig. 1) were they supply heat for evaporating $SO_3$ gas from the oleum.

When using a strong $SO_2$ gas through the converter system there is a substantial heat rise of the gases which with a 14% gas is equivalent to approximately 680° F. Thus to reach an inlet temperature of 800° F. at the first contact mass a temperature of 120° on the incoming gas is all that is theoretically required. However, in order to make up for heat losses an additional 50% to 60% of preheat is advisable and this is accomplished in the heat exchanger 72. Instead of heat exchangers this preheating can be carried out in any type of heating equipment, as, for example a steam radiator system. Also, in place of the internal heat exchangers shown one may use external heat exchangers. It is to be understood that I do not wish to limit myself to the particular heat exchange equipment shown in the drawings. The number of contact stages may also be modified, but with a gas containing at least 10% $SO_2$ (as preferred), best results are obtained if at least 3 stages are employed.

The acid gases which have given up part of their heat in the evaporator 94 are absorbed in a standard absorption system for $SO_3$ gases. This is here shown as consisting of three towers in series 96, 98 and 100. These correspond to the absorbers 22, 24 and 26 of Fig. 1. Each of these absorbers is shown as being equipped with an acid circulating system, here illustrated by the receiving tanks 102, pumps 104 and acid coolers 106. As previously stated, acid concentrations up to about 40% to 45% oleum are built up in the tower 96 and of about 30% oleum in the tower 98, and about 98% sulphuric acid is maintained in the tower 100.

In connection with the circulating system of tower 96 an additional pump 108 is supplied, which pumps the oleum through a heat exchanger 110, thence through pre-evaporator 112 which is heated in any desired manner, and finally to the evaporator 94 where $SO_3$ gas is distilled off until the acid contains about 15% to 25% free $SO_3$. This hot, weak oleum is then returned through the heat exchanger 110 where it is cooled and then returned to the circulating system of tower 98 for fortification.

The $SO_3$ gases from the evaporator 94, at substantially 100% strength, pass through the pipe 42 to the reactor 34 as has previously been explained.

While from the broad point of view of my process the particular arrangement of the equipment shown is intended to be illustrative, nevertheless I have found this general arrangement, whereby the $SO_3$ gas is absorbed in oleum and then distilled off, to be a particularly efficient way of obtaining the substantially pure $SO_3$ gas utilized in my process.

The proportions of materials used will naturally vary with the nature of the alkylation sludge to be treated but when once the nature of the process is understood the proper proportions of materials can readily be computed by any competent chemical engineer familiar with production and handling of sulphuric acid. I may, however, point out that the amount of $SO_3$ introduced into the reactor should be rather accurately controlled. Generally speaking it is desirable to have substantially all of the hydrocarbons decomposed. To accomplish this fully an excess of $SO_3$ may be present and if an excess of $SO_3$ gas is employed this should be removed from the exit gases. This may be done by one of the methods well known in the art, as for example by electrical precipitation or by coke-box scrubbing. Due to the fact that the gas concentration is high this is not unduly expensive as in most cases a rather small coke-box may suffice. I prefer, however, to use a very slight deficiency of $SO_3$ in the reactor as I have found that a small residue of undecomposed hydrocarbons in the acid does not interfere with the reuse in the alkylation process. In any event, it is to be noted that the function of the $SO_3$ gas is to destroy the hydrocarbons and thereby generate heat instead of being used for direct build-up of the $H_2SO_4$ content by absorption. Actually at the temperatures employed in the reactor, virtually no absorption of $SO_3$ will take place. For this reason it may be noted in Fig. 1 that the amount of $H_2SO_4$ withdrawn from the reactor 10 is the same as that put in (90 lbs. $H_2SO_4$), though its concentration is somewhat increased by driving off excess water. Any increase in the amount of $H_2SO_4$ coming out of the entire process results from the 3½ lbs. of make-up acid fed from the 98% acid absorber 26, into the acid stream which leaves the reactor.

Due to the fact that the sludge treated in the absorber is preferably treated by counter-current the temperature in the absorber naturally will vary progressively upward from either approximately atmospheric or preheat temperature at the point where the sludge is introduced into the system, to a maximum which will not materially exceed the boiling point of 98.3% sulphuric acid.

As regards the nature of the sludge to be treated I have pointed out that this process is particularly adapted for treating alkylation sludges but if other sludges having a relatively high acid content (and therefore a relatively low content of hydrocarbons) become available, obviously the process would also be suited for treating such sludges.

This process has a large number of advantages.

In the first place expensive heat recuperating equipment, gas cooling, water condensing and mist removal equipment is eliminated. Such equipment always is subject to some trouble and high repair cost, due to excessive heat conditions and corrosion trouble due to the acid conditioning of the gases.

Where direct cooling of the gases with water is not permissible, indirect cooling must be resorted to and this cooling is rather expensive where cooling water is scarce and the temperature high as is mostly the case in locations where oil refineries are located.

It is true that instead of this equipment oleum absorption and distillation equipment is required but this equipment is all steel and little or no repair and upkeep is required, as corrosion is negligible.

The process requires no fuel, the reaction temperatures are lower and consequently considerably less cooling is required. When cooling is done it is not required to go down to as low temperatures as are necessary in connection with the process in accordance with patent application 446,719, now Patent No. 2,406,930, issued September 3, 1946.

As the gas concentration utilized in the contact plant is higher than normally used proportionally less contact mass or catalyst can be utilized for the same conversion efficiency.

This application is a continuation in part of my earlier application Serial No. 567,083, filed December 7, 1944, now abandoned.

What I claim is:

1. A continuous process of treating acid sludges such as those that result from the alkylation process of producing gasoline that contain $H_2SO_4$, water, and at least 4% of hydrocarbons, which comprises the steps of continuously passing such a sludge into a reactor where it is heated to approximately the constant boiling temperature of 98% acid, continuously passing into such reactor an amount of concentrated $SO_3$ gas approximately sufficient to react with all the carbon of such hydrocarbons to form $SO_2$ and $CO_2$, utilizing the heat of such reaction for maintaining the liquid in the reactor at a temperature which is substantially the constant boiling temperature of 98% acid whereby excess water is boiled off, and continuously withdrawing from such reactor approximately the same amount of $H_2SO_4$ as is being introduced into the same but in the form of purified sulphuric acid of about 98% strength while substantially all the sulphur introduced as $SO_3$ is volatilized as $SO_2$ and passes off with excess water vapor and $CO_2$.

2. A process as specified in claim 1 in which the sludge is caused to flow downwardly in the reactor and the $SO_3$ gas is caused to flow up through the reactor and the purified sulphuric acid is withdrawn from the bottom of the reactor and the vapors and gases are withdrawn from the top.

3. A process as specified in claim 2 in which heat units from the sulphuric acid withdrawn from the reactor are transferred to sludge being introduced into the reactor to assist in maintaining the proper heat balance.

4. A process as specified in claim 2 which includes the further steps of purifying the $SO_2$ gas evolved, reoxidizing such $SO_2$ to $SO_3$, concentrating such $SO_3$ so as to separate it from the normal air and nitrogen present from the oxidation reaction and returning concentrated $SO_3$ gas to the reactor to treat additional quantities of sludge.

NICOLAY TITLESTAD.

REFERENCES CITED

The following references are of record in the file of this patent:

UNITED STATES PATENTS

| Number | Name | Date |
|---|---|---|
| 2,066,774 | Fowler | Jan. 5, 1937 |
| 2,069,472 | Dufford | Feb. 2, 1937 |
| 2,110,267 | Harrington et al. | Mar. 8, 1938 |
| 2,302,825 | Wilde | Nov. 24, 1942 |

OTHER REFERENCES

Chemical Refining of Petroleum, Kalichevsky and Stagner 1, A. C. S. Monograph series No. 63. pages 55, 56, 98.